F. H. KANE.
MACHINE FOR CUTTING PINS, DOWELS, &c.

No. 186,348. Patented Jan. 16, 1877.

Witnesses:
Peter McLennan
John White

Inventor:
Frank H. Kane
by J. J. Greenough Atty

UNITED STATES PATENT OFFICE.

FRANK H. KANE, OF SYRACUSE, NEW YORK.

IMPROVEMENT IN MACHINES FOR CUTTING PINS, DOWELS, &c.

Specification forming part of Letters Patent No. 186,348, dated January 16, 1877; application filed October 26, 1874.

*To all whom it may concern:*

Be it known that I, FRANK H. KANE, of the city of Syracuse, New York, have invented an Improvement in Machines for Cutting Pins, Dowels, &c., of which the following is a full and exact description, reference being had to the accompanying drawings, in which—

Figure 1:
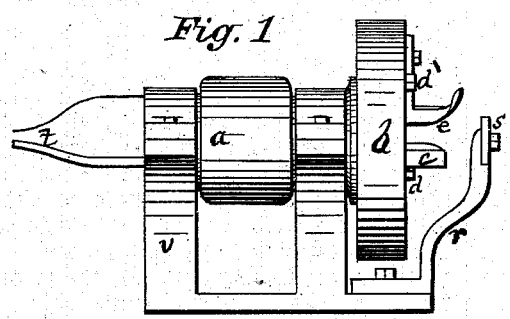
Figure 2:
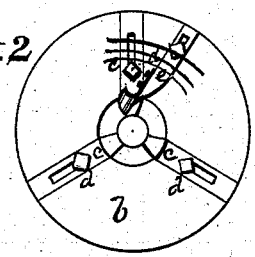
Figure 3:
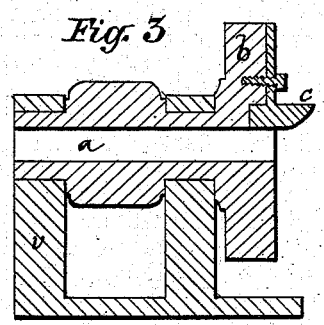
Figure 4:
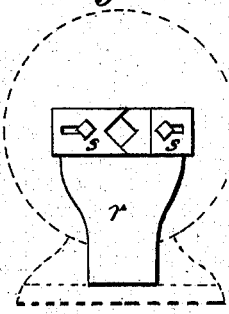
Figure 5:

Figure 1 is a side elevation of the machine. Fig. 2 represents the face of the mandrel. Fig. 3 is a longitudinal section in the plane of the axis of the hollow mandrel. Fig. 4 is a front view of the rest. Fig. 5 is a guide detached.

In order to enable those skilled in the art to make and use my invention, I will proceed to give a more particular description of the same.

Upon the face of a hollow mandrel, of usual and well-known form, running in boxes, and supported by any suitable frame, I cut radial grooves and concentric circles, the former for the purpose of retaining adjustable guides and cutters, and the latter serving, in conjunction with marks upon said guides and cutters, as a means of facilitating and determining the adjustment of the machine to produce different sizes of dowels.

These guides $c$ are shown on the face $b$ of the mandrel $a$, and a guide detached from the face $b$ is shown at Fig. 5; and consists of a T-shaped piece of iron, the shank of which slotted to receive the screw-bolt $d$, by means of which it is retained in its groove, and at any desired distance from the center of rotation of the mandrel $a$.

It is also plainly shown that the outer end of the cross-piece of the guide is beveled, in order to direct the rod to the center of the mandrel. In like manner the cutter $e$ is attached to the face of the mandrel in its groove.

The guides and cutter may be adjusted by means of mechanism similar to universal chucks, and simultaneously.

The cutter $e$ consists of a flat bar of iron or other suitable material, having a slot of sufficient width to receive the bolt $d$, Fig. 2, and length sufficient to admit the change of position from the center of rotation to the inner edge of the hollow mandrel. To the shank of the cutter is attached, in any suitable manner, a bar or piece of sheet-steel tapered at one extremity to a cutting-edge, and this tapered portion is bent outwardly (when in position on the face of the mandrel) and upwardly from the center of rotation of the mandrel. The cutter $e$ is held to the face of the mandrel by one bolt, $d'$, and is aided to overcome the resistance of the material to be cut by the adjacent guide, which is beveled in a direction corresponding to the line of intersection of the guide and cutter with each other.

The object of this construction is that the point, or that portion of the cutter farthest from the face-plate, may "rough" cut the material to nearly the finished or final size to which it is to be reduced, thus leaving a thinner portion to be cut or removed by the heel of the cutter, and insuring a more finished product. The shank of this cutter is slotted in a similar manner to the guides above described.

This construction of the cutter permits of the replacing of broken or dulled blades without changing the slotted shank, and is more cheaply and quickly constructed, being of sheet steel.

In front, directly opposite, and at a convenient distance from, the face of the mandrel, I place a rest, consisting of two flat bars, $s\ s$, of any suitable material, their inner ends lapping each other, and each having a nearly V-shaped cut therein, slotted as are the guides, and movably attached to the standard $r$. By moving these bars toward and from each other they are adapted to receive, hold, and guide different-sized stock to the cutter $e$. At the rear end of the hollow mandrel $a$ is a spring, $t$, for the purpose of supporting the finished portion of a dowel when passing through the machine. Another rest may be stationed at the rear for the same purpose.

It will be readily seen that by changing the position of the cutter and guides toward or from the center of rotation of the hollow mandrel, a smaller or larger sized dowel is produced, and that by means of the concentric rings and marks upon the cutter and guides the machine can at once be set to any desired size.

What I claim, and wish to secure by Letters Patent, is—

1. A hollow mandrel, having concentric rings, for the purpose of determining the adjustment of the cutter and guides, as described.

2. The cutter $e$ and adjacent beveled guide $c$, in combination with a hollow mandrel, all having concentric lines upon their faces, as and for the purpose set forth.

FRANK H. KANE.

Witnesses:
J. J. GREENOUGH,
PETER B. McLENNON.